US012590620B2

(12) United States Patent     (10) Patent No.:   US 12,590,620 B2

Kino     (45) Date of Patent:    Mar. 31, 2026

(54) STRAIN WAVE GEARING HAVING TORQUE SENSOR

(71) Applicant: HARMONIC DRIVE SYSTEMS INC., Tokyo (JP)

(72) Inventor: Manabu Kino, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/841,444

(22) PCT Filed: Feb. 14, 2023

(86) PCT No.: PCT/JP2023/004901

§ 371 (c)(1),
(2) Date: Mar. 6, 2025

(87) PCT Pub. No.: WO2024/171276

PCT Pub. Date: Aug. 22, 2024

(65) Prior Publication Data

US 2025/0389316 A1     Dec. 25, 2025

(51) Int. Cl.
    *F16H 49/00*      (2006.01)
    *F16H 1/32*      (2006.01)
    *G01L 3/14*      (2006.01)

(52) U.S. Cl.
    CPC ............. *F16H 1/32* (2013.01); *F16H 49/001* (2013.01); *G01L 3/14* (2013.01)

(58) Field of Classification Search
    CPC ......................... F16H 49/001; F16H 2049/003
    See application file for complete search history.

(56) References Cited

U.S. PATENT DOCUMENTS

| | | | |
|---|---|---|---|
| 6,050,155 A * | 4/2000 | Tortora | F16H 49/001 74/640 |
| 10,197,146 B2 * | 2/2019 | Lin | G01L 3/1478 |

(Continued)

FOREIGN PATENT DOCUMENTS

| | | | | |
|---|---|---|---|---|
| CN | 109139856 A * | 1/2019 | | G01L 3/108 |
| CN | 113719585 A * | 11/2021 | | B25J 9/1025 |

(Continued)

OTHER PUBLICATIONS

PCT/ISA/210, "International Search Report for PCT International Application No. PCT/JP2023/004901," Mar. 20, 2023.

*Primary Examiner* — Sherry L Estremsky
(74) *Attorney, Agent, or Firm* — Kreative IP Management LLC; Fuiyeong Kim

(57) ABSTRACT

A strain wave gearing (1) is configured to have a unitized structure having a main bearing (5) that supports an internally toothed gear (2) and an externally toothed gear (3) in a manner that allows relative rotation, and an output flange (6) that is linked to the externally toothed gear (3). The externally toothed gear (3) is formed in the shape of a wine glass and ensures a large hollow diameter, which is required in cases where the externally toothed gear (3) is incorporated into a robot joint part or the like. A strain gauge (101) of a torque sensor (100) is attached to an outward-facing end surface portion of the output flange (6) linked to the externally toothed gear (3). The torque sensor (100) is capable of precisely detecting rotational torque without being affected by flexing of the externally toothed gear (3), and elements such as the strain gauge (101) are not exposed to oil, grease, or the like.

3 Claims, 1 Drawing Sheet

(56)                    References Cited

U.S. PATENT DOCUMENTS

| | | | | |
|---|---|---|---|---|
| 10,337,561 B2 * | 7/2019 | Jackowski | ............... | B25J 19/06 |
| 10,739,216 B2 * | 8/2020 | Haehnle | ................ | G01L 3/1457 |
| 11,267,133 B2 * | 3/2022 | Fürstenberger | ...... | B25J 19/0075 |
| 12,196,306 B2 * | 1/2025 | Takagi | .................. | G01L 3/1457 |
| 2023/0193989 A1 * | 6/2023 | Hu | ......................... | H02K 7/116 |
| | | | | 74/413 |
| 2024/0337313 A1 * | 10/2024 | Okazaki | .................... | G01L 1/22 |

FOREIGN PATENT DOCUMENTS

| | | | |
|---|---|---|---|
| JP | 2000-320622 | A | 11/2000 |
| JP | 2004-198400 | A | 7/2004 |
| JP | 2005-069402 | A | 3/2005 |
| JP | 2020-201046 | A | 12/2020 |
| JP | 2021-042848 | A | 3/2021 |

* cited by examiner

102: Sensor Substrate
104: Torque Sensor/Signal Processing Circuit
105: Control Unit
106: Storage Unit
107: Communication Module
110: Temperature Sensor
120: Acceleration Sensor

STRAIN WAVE GEARING HAVING TORQUE SENSOR

TECHNICAL FIELD

The present invention relates to a strain wave gearing provided with a torque sensor that detects rotational torque transmitted via an externally toothed gear.

BACKGROUND ART

In the cooperative-robot market, it is necessary to implement torque sensing for joints of the robots for purposes of collision sensing or teaching a response when a person directly touches a robot arm. Therefore, a torque sensor is installed at the site of a gear reducer of a robot joint part. The gear reducer incorporated into the robot joint part must assume a hollow form for the purpose of wiring or the like. A small profile, a short axial length, high rigidity, and low weight are also desired. A configuration is employed in which the torque sensor is built in or integrated at the site of the gear reducer. In Patent Document 1, a strain gauge is affixed to a diaphragm of a flexible externally toothed gear of a strain wave gearing that is used as a gear reducer, and torque transmitted via the externally toothed gear is detected. In Patent Document 2, a strain gauge is affixed to a wine-glass-shaped externally toothed gear of a strain wave gearing, from a diaphragm of the externally toothed gear to a boss thereof, to detect rotational torque.

PRIOR-ART DOCUMENT

Patent Document

Patent Document 1: JP2004-198400 A
Patent Document 2: JP2000-320622 A

DISCLOSURE OF THE INVENTION

Problems to be Solved by the Invention

It is necessary for the hollow diameter of a strain wave gearing that is used as a gear reducer incorporated into a robot joint part or the like to be as large as possible. A torque sensor implemented on the strain wave gearing also presents the following problems to be remedied.
(Problem 1: Improving Precision of Torque Detection)
A flexible externally toothed gear of the strain wave gearing is caused to flex into an ellipsoidal shape by a wave generator, and portions in the circumferential direction of the externally toothed gear are each repeatedly displaced in a radial direction as the wave generator rotates. The radial-direction displacement of the externally toothed gear associated with the rotation of the wave generator is also detected by a strain gauge. In Patent Document 1, a countermeasure for reducing such displacement (ellipsoidal strain) of the externally toothed gear is implemented. It is desirable to more reliably eliminate any effects caused by the displacement of the externally toothed gear to further improve the precision of torque detection.
(Problem 2: Improving Durability of Sensor Unit)
When the rotational torque is detected using the strain gauge affixed to the diaphragm of the flexible externally toothed gear, appreciable three-dimensional displacement occurs in the portion of the strain gauge that is affixed to the diaphragm due to the rotation of the wave generator, in addition to rotational strain produced due to application of torque. Since the displacement amount is large, at several microns, the strain gauge or lead will be more prone to disconnect and the sensor unit will have low durability for practical use. In Patent Document 2, the strain gauge is affixed to the diaphragm and the rigid boss in a state of straddling the boundary between these two components, whereby disconnection of a lead line or the like is avoided, but there is still room for improvement.
(Problem 3: Easiness of Sensor Installation)
Problems have been presented in the prior art in that materials are limited and installation cannot easily be carried out due to the structure used to affix the strain gauge to the diaphragm, which repeatedly undergoes elastic deformation, of the externally toothed gear. Additionally, the sensor is installed inside the gear reducer; therefore, it is necessary to protect the strain gauge and other sensor-constituting components from grease or oil.

Additionally, it is desirable for the strain wave gearing to be furnished with a function for monitoring symptoms (predicting faults) as a safety function, which have come to be in increasing demand. For example, it is desirable to be capable of monitoring the temperature, acceleration, and other parameters of the strain wave gearing and making a diagnosis for fault prediction or the like on the basis of these parameters. Issues to be improved upon in this case are as follows.
(Problem 4: Positions of Temperature Sensor and Acceleration Sensor being Distant from Gear Reducer)
There are cases where sensors other than the torque sensor, such as a temperature sensor and an acceleration sensor, are incorporated into a prior-art robot joint part. The sensors often are installed on an encoder substrate of a servo motor unit of an actuator incorporated into the robot joint part. The encoder substrate is present at a position set apart from the gear reducer (strain wave gearing); it is impossible to accurately acquire states pertaining to the temperature or the vibration at the site of the gear reducer for which measurements were originally intended to be made, and there is room for improvement.
(Problem 5: Recording of Irregular Torque Generated in Gear Reducer)
Abnormal torque may be applied to the site of the gear reducer (strain wave gearing) when the robot arm collides or suddenly stops. As a result, the gear reducer is damaged. However, in the prior art, no evidence remains indicating that the abnormal torque was applied to the gear reducer, and it is difficult to estimate the cause of the damage.

In view of the foregoing, it is a main object of the present invention to provide a strain wave gearing having a torque sensor, the strain wave gearing being configured so that it is possible to increase the hollow diameter and to avoid any reduction in the precision of torque detection caused by flexing of an externally toothed gear.

Means Used to Solve the Above-Mentioned Problems

To solve the aforementioned problems, in the present invention,
a strain wave gearing is configured to have a unitized structure comprising a main bearing that supports an internally toothed gear and an externally toothed gear in a manner that allows relative rotation, and a flange that is linked to the externally toothed gear and functions as an output shaft or the like,
a wine-glass-shaped externally toothed gear is employed as the externally toothed gear, thereby ensuring a large hollow diameter, which is required in cases where the strain wave gearing is incorporated into a robot joint part or the like, and a torque detection element of a torque sensor is attached to the flange linked to the externally toothed gear and is configured to be capable of more precisely detecting rotational torque without being affected by flexing of the externally toothed gear. In particular, the torque detection element is attached to the outer-side end surface of the flange and is formed so as not to be exposed to oil, grease, or the like.

An annular recess that functions as a sensor-accommodating recess is formed on the outer-side-end-surface side of the flange, and sensors such as a temperature sensor and an acceleration sensor are implemented on a sensor substrate of the torque sensor, which is accommodated in the annular recess. It is thereby possible for a portion where the sensors are disposed to be kept from increasing in size and for the state and the symptoms of the strain wave gearing to be precisely monitored.

MODE FOR CARRYING OUT THE INVENTION

Figure 1:
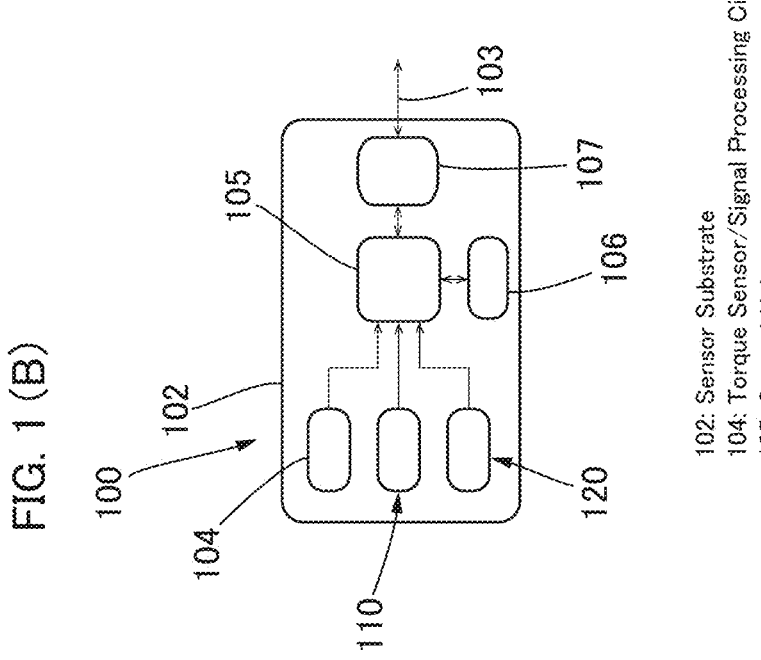
FIG. 1(A) is a longitudinal cross-sectional view showing a strain wave gearing having a torque sensor to which the present invention is applied.
FIG. 1(B) is a function block diagram showing sensors that are mounted on a sensor substrate of a torque sensor accommodated in a sensor-accommodating recess.
Figure 1:
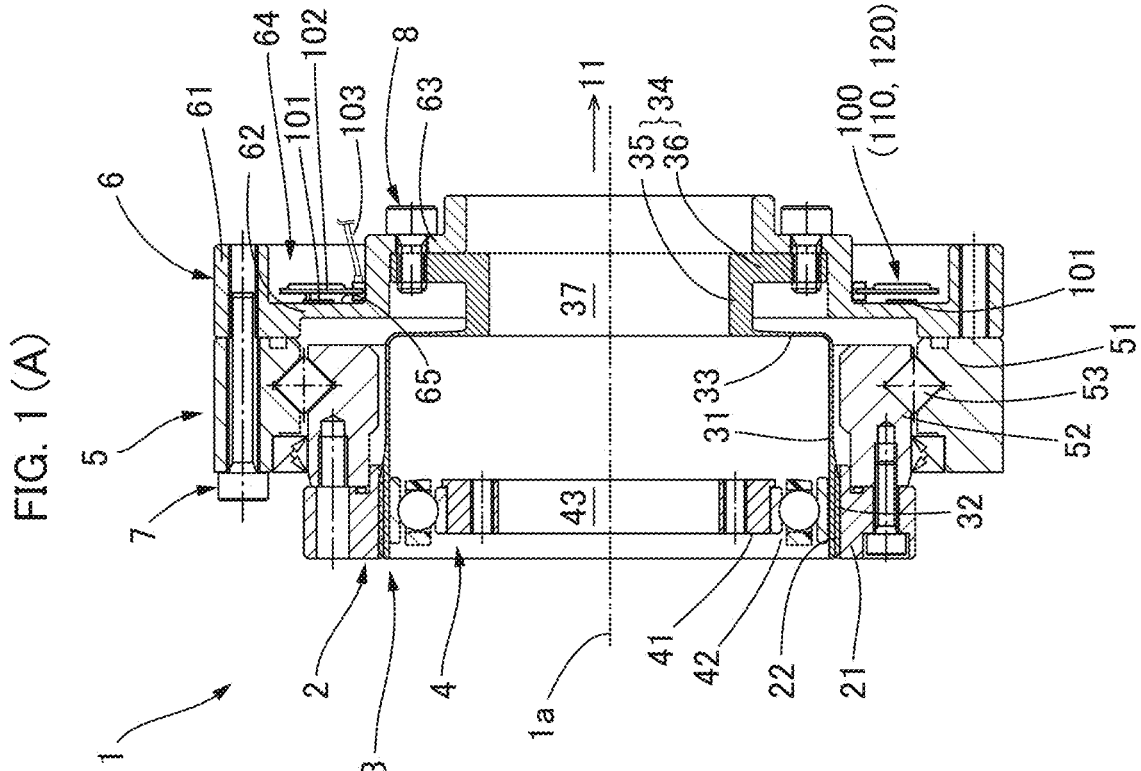

An embodiment of a strain wave gearing having a torque sensor to which the present invention is applied is described below with reference to the accompanying drawings. The present invention is in no way limited to the configuration in the embodiment described below.

A strain wave gearing 1 having a torque sensor (referred to below simply as "strain wave gearing 1") has a unitized structure and comprises a rigid internally toothed gear 2, a flexible externally toothed gear 3, a wave generator 4, a main bearing 5 composed of a cross roller bearing that supports the internally toothed gear 2 and the externally toothed gear 3 in a manner that allows relative rotation, and a disc-shaped output flange 6 linked to the externally toothed gear 3. In the present example, the internally toothed gear 2 is a stationary-side member attached to a secured-side member (not shown), the wave generator 4 is an input member to which rotation is inputted from a motor shaft or another rotation-inputting shaft, and the externally toothed gear 3 is an output-side member by which reduced rotation is outputted to a load side (not shown) via the output flange 6. The strain wave gearing 1 is, for example, incorporated into a robot joint part and used as a gear reducer of a limited-rotation actuator that causes a load-side member to turn within a limited rotation-angle range of less than 360° about a joint axis.

The internally toothed gear 2 is provided with a rigid annular member 21 of rectangular cross-section, and internal teeth 22 formed along the inner peripheral surface of the annular member 21. The externally toothed gear 3 is formed in the shape of a wine glass and is provided with: a radially flexible cylindrical barrel part 31; external teeth 32 formed on an outer-peripheral-surface portion at an open end of the cylindrical barrel part, the open end being one end of the cylindrical barrel part; a diaphragm 33 extending radially inward contiguously with the other end of the cylindrical barrel part 31; and a rigid boss 34 formed contiguously with the inner peripheral edge of the diaphragm 33. The external teeth 32 face the internal teeth 22 of the internally toothed gear 2. The boss 34 is provided with a cylindrical part 35 extending coaxially in a first direction 11 from the inner peripheral edge of the diaphragm 33 toward the side opposite from the cylindrical barrel part 31 along the direction of an axis 1a (axial direction), and an annular part 36 spreading radially outward in a coaxial manner from the shaft end of the cylindrical part 35. The outside diameter of the annular part 36 is equal to or slightly less than the outside diameter of the cylindrical barrel part 31. A large-diameter boss hollow part 37 is defined by the circular inner peripheral surface of the cylindrical part 35.

The wave generator 4 is provided with: a rigid cam plate 41 of annular form; and a wave generator bearing 42 fitted to the non-circular outer peripheral surface, e.g., ellipsoidal outer peripheral surface of the cam plate 41, the wave generator bearing 42 being flexed into the non-circular shape. The wave generator 4 is fitted into the inner peripheral surface of the cylindrical barrel part 31 on the open-end side, which is where the external teeth 32 of the externally toothed gear 3 are formed. The portion where the external teeth 32 are formed is caused to flex into a non-circular shape, e.g., an ellipsoidal shape, by the wave generator 4, and the external teeth 32 mesh with the internal teeth 22 at a plurality of positions that are set apart in the circumferential direction. The cam plate 41 is linked to a motor shaft or other rotation-inputting shaft (not shown) and is driven to rotate. When the cam plate 41 rotates, the positions where the external teeth 32 mesh with the internal teeth 22 move in the circumferential direction. A wave generator hollow part 43 of roughly the same size as the boss hollow part 37 is defined by the circular inner peripheral surface of the cam plate 41.

The main bearing 5 is disposed on the outer side of the cylindrical barrel part 31 of the externally toothed gear 3 and adjacent to the internally toothed gear 2 in the axial direction. The main bearing 5 coaxially surrounds the cylindrical barrel part 31 of the externally toothed gear 3 and is provided with an outer race 51, an inner race 52, and a plurality of rolling elements 53 that are inserted into a raceway formed between the outer and inner races 51, 52. The inner race 52 is securely fastened in a coaxial manner to an annular internal-tooth end surface of the internally toothed gear 2, the internal-tooth end surface facing in the first direction 11. The outer race 51 is linked to the boss 34 of the externally toothed gear 3 via the output flange 6.

The output flange 6 is provided with an outer-peripheral-side annular portion 61, an intermediate annular portion 62, and an inner-peripheral-side annular portion 63 in order from the outer-peripheral side toward the inner-peripheral side. The outer-peripheral-side annular portion 61 is securely fastened in a coaxial manner to an outer-race end surface of the outer race 51 of the main bearing 5 by fastening bolts 7, the outer-race end surface facing in the first direction 11. The inner-peripheral-side annular portion 63 is securely fastened in a coaxial manner to an annular boss end surface of the annular part 36 of the boss 34 of the externally toothed gear 3 by fastening bolts 8, the annular boss end surface facing in the first direction 11 in the axial direction. An annular recess is formed as a sensor-accommodating recess 64 in the intermediate annular portion 62 of the output flange 6, the sensor-accommodating recess being open on the first-direction 11 side in the axial direction and being formed to have a rectangular cross-sectional shape of prescribed depth in the direction opposite from the first direction 11. A torque sensor 100 is fitted to the sensor-accommodating recess 64.

The torque sensor 100 detects rotational torque transmitted via the externally toothed gear 3 and the output flange 6 and is provided with, inter alia, a strain gauge 101 affixed to the output flange 6, a sensor substrate 102 on which electronic components for wiring and signal processing are mounted, and wiring 103 led from the sensor substrate 102 to the outside. The strain gauge 101 is affixed to an end surface portion of the intermediate annular portion 62 of the output flange 6, the end surface facing in the first direction 11; specifically, the strain gauge 101 is affixed to a bottom-surface portion 65 of the sensor-accommodating recess 64. For example, a plurality of strain gauges 101 are affixed at equiangular intervals along the circumferential direction. Alternatively, it is permissible to employ a configuration in which a wiring pattern or the like that defines the strain gauge is stacked directly on the bottom-surface portion 65. The sensor substrate 102 is, for example, a disc-shaped substrate and is secured to the output flange 6.

A temperature sensor 110 and an acceleration sensor 120 are also mounted, in addition to a torque-sensor circuit part, on the sensor substrate 102 of the torque sensor 100. FIG. 1(B) is a schematic function block diagram of the sensors that are mounted on the sensor substrate 102 accommodated in the sensor-accommodating recess 64. Together with a signal processing circuit 104 for processing signals from the strain gauge 101 of the torque sensor 100, the temperature sensor 110 (detection circuit and signal processing circuit) and the acceleration sensor 120 (detection circuit and signal processing circuit) are mounted on the sensor substrate 102. A control unit 105 composed of a microcomputer, a storage unit 106 composed of an EEPROM, a flash memory, or the like, and a communication module 107 (RS-485, etc.) are also implemented on the sensor substrate 102. Information pertaining to the torque, the reduction gear temperature, and the acceleration that are detected is stored in the storage unit 106 and transmitted to a higher-order apparatus (not shown).

As described above, the strain wave gearing 1 is configured to have a unitized structure in which the internally toothed gear 2 and the externally toothed gear 3 are assembled using the main bearing 5 in a manner that allows relative rotation, the strain gauge 101 of the torque sensor 100 is attached to the output flange 6 via which reduced rotation is outputted from the externally toothed gear 3, and a wine-glass-shaped externally toothed gear 3 is employed. It is thereby possible to precisely detect rotational torque in the strain wave gearing 1 using the torque sensor 100 while ensuring a sufficiently large hollow part. Employing the wine-glass-shaped externally toothed gear 3 makes it easier to set the ratio of the hollow diameter to the device outside diameter to 20% or greater. Additionally, implementing the temperature sensor 110 and the acceleration sensor 120 on the sensor substrate 102 makes it possible to precisely monitor the state and the symptoms of the gear reducer configured from the strain wave gearing 1. More specific explanation will be made below.

(Problem 1)

The strain gauge 101 of the torque sensor 100 is attached to the output flange 6, which is a rigid member, thereby making it possible to reliably eliminate, from the torque sensor output, any effect caused by strain produced in the externally toothed gear 3 in association with rotation of the wave generator 4.

The output flange 6 is fastened to the main bearing 5 (cross roller bearing) and is structured so that a moment load of the robot arm or the like in which the strain wave gearing 1 is incorporated is received by the main bearing 5. Therefore, the moment load is not applied to the output flange 6, which is the site where torque is detected. Thus, the torque sensor 100 is capable of detecting only rotational torque; therefore, the precision of torque detection is high.

(Problem 2)

The output flange 6 does not flex due to the wave generator 4 in the same manner as the externally toothed gear 3; therefore, it is possible to eliminate disconnection of the strain gauge 101 of the torque sensor 100 or a lead line that is led out therefrom.

(Problem 3)

The portion of the strain wave gearing 1 where the torque sensor 100 is installed is the sensor-accommodating recess formed in the output flange 6 on the side facing in the first direction 11 in the axial direction. The sensor-accommodating recess opens to the outside of the device and is not limited to accommodating a typical strain gauge that operates as a resistor, it being possible to freely select a semiconductor-type torque detection element. The location where the torque sensor 100 is disposed is on the side of an inner-side end surface of the output flange 6, i.e., is partitioned from the interior of the strain wave gearing 1 by the output flange 6. It is unnecessary to protect the torque sensor 100 from grease or oil that is charged or supplied into the interior of the strain wave gearing. As shall be apparent, it is also possible to cover the sensor-accommodating recess with a lid to block the sensor-accommodating recess.

(Problem 4)

The temperature sensor 110 and the acceleration sensor 120 are also installed on the sensor substrate of the torque sensor 100 in the sensor-accommodating recess formed in the output flange 6. It is thereby possible to use the following functions.

Specifically, the temperature of the strain wave gearing 1 (gear reducer unit) can be measured using the temperature sensor 110, and the state of deterioration of grease or the state of insufficiency of lubrication can be observed on the basis of the temperature. In particular, during use in a high-temperature state, premature deterioration of the sealed grease progresses, and the strain wave gearing 1 experiences wear due to insufficiency of lubrication as a result. Such circumstances can be preemptively prevented.

It is also possible to implement a function for issuing a warning when the temperature of the strain wave gearing 1 is high. For example, vibration is generated when an abnormality occurs in a raceway surface or a steel ball in the bearing used in the strain wave gearing 1. Such vibration can be detected immediately by the acceleration sensor and utilized for preventive maintenance. Additionally, when vibration is generated in the robot in which the strain wave gearing is incorporated, frequency analysis data pertaining to a signal from the acceleration sensor serves as a resource for investigating the cause of the vibration.

(Problem 5)

An EEPROM or FLASH (registered trademark) is installed on the sensor substrate, thereby making it possible to implement a function for automatically saving a peak value or frequency of occurrence when torque at or above a permissible torque is applied, and a function for recording temperature data. The recorded data can be used for inspection when a fault occurs. Additionally, the recorded data can be outputted as an alert to a user and utilized for preventive maintenance. As shall be apparent, implementing the sensors in a plurality of systems, e.g., two systems, makes it possible to also impart redundancy.

Other Embodiments

In the strain wave gearing 1 described above, the boss 34 of the externally toothed gear 3 and the output flange 6 on which the torque sensor 100 is implemented are fastened together by bolts. Alternatively, it is possible to join the output flange 6 to the boss 34 of the externally toothed gear 3 by welding. Opting for welding makes it possible to further flatten the strain wave gearing 1 and to improve the rotational torque.

Additionally, in the strain wave gearing 1 described above, the internally toothed gear 2 is a stationary-side (secured-side) member, the externally toothed gear 3 is a driven-side member, and the flange on which the torque sensor 100 is implemented is the output flange 6 secured to the externally toothed gear 3. Alternatively, by changing the structure of the input shaft linked to the wave generator 4, the externally toothed gear 3, to which the flange on which the torque sensor 100 is implemented is secured, can be the stationary-side member, and the internally toothed gear 2 can be the drive side member capable of outputting reduced rotation at a movable angle of 360° or greater.

The invention claimed is:

1. A strain wave gearing comprising:
a rigid internally toothed gear;
a flexible externally toothed gear that is coaxially disposed on an inner side of the internally toothed gear;
a wave generator that is coaxially disposed on an inner side of the externally toothed gear, the wave generator causing the externally toothed gear to flex into a non-circular shape and partially mesh with the internally toothed gear and causing positions where the externally toothed gear and the internally toothed gear mesh to move in a circumferential direction;
a main bearing that is coaxially disposed on an outer side of the externally toothed gear, the main bearing supporting the internally toothed gear and the externally toothed gear in a manner that allows relative rotation;
a flange that securely links the externally toothed gear to one race of the main bearing; and
a torque sensor that detects rotational torque transmitted via the externally toothed gear,
wherein
the externally toothed gear is formed with a cylindrical barrel part that has external teeth formed on an outer peripheral surface thereof and is capable of flexing in a radial direction, a diaphragm that extends radially inward from one end of the cylindrical barrel part, and a rigid boss that is formed contiguously with an inner peripheral edge of the diaphragm, the boss is provided with a hollow shaft part that coaxially extends in a first direction from the inner peripheral edge toward a side opposite from the cylindrical barrel part along an axial direction, and an annular part that coaxially spreads radially outward from a shaft distal end of the hollow shaft part,
a torque detection element of the torque sensor is disposed on the flange,
the flange is provided with a flange outer-side end surface that faces in the first direction in the axial direction,
the torque detection element is attached to the flange outer-side end surface, and
a temperature sensor and an acceleration sensor are implemented on a sensor substrate of the torque sensor, the torque sensor being disposed on a flange-outer-side-end-surface side of the flange.

2. The strain wave gearing according to claim 1, wherein:
the main bearing is positioned between the internally toothed gear and the flange in the axial direction;
the flange is provided with
an outer-peripheral-side portion that is coaxially secured to an outer-race end surface of an outer race that is the one race of the main bearing, the outer-race end surface facing in the first direction in the axial direction,
an inner-peripheral-side portion that is coaxially secured to a boss end surface of the boss of the externally toothed gear, the boss end surface facing in the first direction in the axial direction, and
an intermediate portion that connects the outer-peripheral-side portion and the inner-peripheral-side portion; and
the torque detection element is disposed on the flange outer-side end surface of the intermediate portion, the flange outer-side end surface facing in the first direction in the axial direction.

3. The strain wave gearing according to claim 2, wherein:
the intermediate portion of the flange is provided with a sensor-accommodating recess;
the sensor-accommodating recess opens in the first direction between the outer-peripheral-side portion and the inner-peripheral-side portion, the sensor-accommodating recess having a prescribed depth in a direction opposite from the first direction; and
the flange outer-side end surface where the torque detection element is disposed is a bottom-surface portion of the sensor-accommodating recess.

* * * * *